(12) United States Patent
Ibe et al.

(10) Patent No.: US 9,204,666 B2
(45) Date of Patent: Dec. 8, 2015

(54) FOOD PACKAGING METHOD

(71) Applicant: Kureha Corporation, Tokyo (JP)

(72) Inventors: Seiichi Ibe, Omitama (JP); Tsuyoshi Ayaki, Omitama (JP); Hitoshi Ishii, Omitama (JP); Tadayoshi Itoh, Omitama (JP); Akihiro Tayama, Sakuragawa (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/040,764

(22) Filed: Sep. 30, 2013

(65) Prior Publication Data

US 2014/0041337 A1 Feb. 13, 2014

Related U.S. Application Data

(62) Division of application No. 12/450,408, filed as application No. PCT/JP2008/052821 on Feb. 20, 2008.

(30) Foreign Application Priority Data

Mar. 23, 2007 (JP) .................................. 2007-077142

(51) Int. Cl.
| | |
|---|---|
| B65B 25/06 | (2006.01) |
| A23L 3/3418 | (2006.01) |
| B65D 81/20 | (2006.01) |
| B65B 31/02 | (2006.01) |
| A23B 4/16 | (2006.01) |
| B65B 31/00 | (2006.01) |

(52) U.S. Cl.
CPC .................. *A23L 3/3418* (2013.01); *A23B 4/16* (2013.01); *B65B 25/067* (2013.01); *B65B 31/024* (2013.01); *B65D 81/2023* (2013.01); *B65D 81/2084* (2013.01); *A23V 2002/00* (2013.01); *B65B 31/00* (2013.01)

(58) Field of Classification Search
CPC .................. B65B 31/00; B65B 31/02–31/024; B65B 31/025; B65B 31/04; B65B 25/06; B65B 25/061; B65B 25/062; B65B 25/064; B65B 25/065–25/067; B65B 55/00; B65D 75/32; B65D 2275/00; B65D 2275/02; B65D 81/20; B65D 81/2046; B65D 81/2053; B65D 81/2007–81/2038; B65D 81/2069–81/2092; B65D 81/2023; A23L 3/00; A23L 3/34; A23L 3/3409; A23L 3/3418; A23L 3/015; A23L 3/0155; A23B 4/00; A23B 4/14; A23B 4/16; A23V 2002/00; A23V 2200/10; A23V 2250/11
USPC .......... 426/129, 321, 392, 393, 395, 397, 402, 426/404, 410, 413, 418, 315, 316, 320, 426/324–326, 332, 335, 641–646
See application file for complete search history.

(56) References Cited

U.S. PATENT DOCUMENTS

| | | | | | |
|---|---|---|---|---|---|
| 2,623,826 | A | * | 12/1952 | Grinstead | ...................... 426/413 |
| 2,967,777 | A | * | 1/1961 | Grindrod | ............. A23C 19/166 |
| | | | | | 426/130 |
| 3,351,265 | A | * | 11/1967 | Miller | ................ B65D 77/2024 |
| | | | | | 206/205 |
| 3,454,158 | A | * | 7/1969 | Tigner | ........................... 206/471 |
| 3,968,629 | A | * | 7/1976 | Gidewall et al. | ............. 53/374.8 |
| 4,744,199 | A | * | 5/1988 | Gannon | ........................... 53/434 |
| 4,926,614 | A | * | 5/1990 | Costello et al. | ................... 53/434 |
| 5,087,462 | A | * | 2/1992 | Bekele | .................... B65D 81/24 |
| | | | | | 206/503 |
| 5,667,827 | A | * | 9/1997 | Breen | .................... B65B 25/067 |
| | | | | | 426/108 |
| 5,711,978 | A | | 1/1998 | Breen et al. | |
| 5,799,463 | A | | 9/1998 | Kashiba | |
| 6,044,622 | A | * | 4/2000 | Brady | ........................ B65B 1/18 |
| | | | | | 426/129 |
| 6,123,969 | A | * | 9/2000 | Sjoberg | ........................... 426/410 |
| 6,440,484 | B1 | * | 8/2002 | Tanaka et al. | ................... 426/643 |
| 6,447,826 | B1 | * | 9/2002 | Matthews | ................. A23B 4/16 |
| | | | | | 426/126 |
| 2002/0043050 | A1 | * | 4/2002 | Costello et al. | ................... 53/434 |
| 2006/0233985 | A1 | * | 10/2006 | Pockat et al. | .................. 428/34.9 |

FOREIGN PATENT DOCUMENTS

| | | |
|---|---|---|
| EP | 0931723 A1 | 7/1999 |
| JP | 60110663 A | 6/1985 |
| JP | 04087926 A | 3/1992 |
| JP | 10225267 A | 8/1998 |
| WO | 9608424 A1 | 3/1996 |

OTHER PUBLICATIONS

SelfNutritionData NPL, www.nutritiondata.self.com/facts/lamb-veal-and-game-products/4749/2#, 2010.*
Gill, C.O. et al, "The Effect of the Initial Gas Volume to Meat Weight Ratio on the Storage Life of Chilled Beef Packaged under Carbon Dioxide", Meat Science, vol. 22, 1988, pp. 53-63.
Zhao, Yanyun et al., "Dynamic Changes of Headspace Gases in CO2 and N2 Packaged Fresh Beef", Journal of Food Science, vol. 60, No. 3, 1995, pp. 571-575.

* cited by examiner

*Primary Examiner* — Drew Becker
(74) *Attorney, Agent, or Firm* — Birch, Stewart, Kolasch & Birch, LLP

(57) ABSTRACT

A food packaging method is provided in which food is packaged in a package with use of carbon dioxide to benefit from bacteriostatic effects and the food package contains the minimum reduced gas spaces and thereby has a volume substantially equal to the food volume. Tightly-fitting food packages are obtained by the method. A tightly-fitting food package is obtained by: placing at least one kind of foods selected from the group consisting of meats and processed meats in a plastic film package; blowing a carbon dioxide gas in the package to fill the package with the carbon dioxide gas in a volume of 10 to 45 cm3 per 100 g of the food as measured at 0° C. and 1 atm; and sealing and refrigerating the package.

5 Claims, No Drawings

FOOD PACKAGING METHOD

CROSS-REFERENCE TO RELATED APPLICATIONS

This is a division of U.S. patent application Ser. No. 12/450,408 filed Sep. 23, 2009, which is the U.S. national stage of International Appl. No. PCT/JP2008/052821, filed Feb. 20, 2008, which was published as International Publication No. WO2008/117594, and which claims benefit of Japanese Patent Appl. No. 2007-077142 filed Mar. 23, 2007 the text of which are incorporated by reference herewith in their entireties.

BACKGROUND OF THE INVENTION

1. Field of the Invention

The present invention relates to tightly-fitting food packages and food packaging methods.

2. Description of Related Art

In the preservation of food quality, oxidative degradation by oxygen is one of factors affecting the food quality. When foods are in the presence of oxygen, lipids or pigments in the foods are oxidized to cause lipid oxidation products or pigment discoloration, greatly deteriorating the food quality.

Oxidative degradation of foods by oxygen during storage or transportation has been prevented by modified atmosphere packaging in which packages are filled with a single or a mixture of inert gases such as nitrogen, carbon dioxide and argon, or by vacuum packaging in which packages are evacuated.

Modified atmosphere packaging with carbon dioxide gas is known to inhibit the growth of microorganisms in foods during storage, by the bacteriostatic effects of carbon dioxide. In the conventional modified atmosphere packaging, however, the gas is filled in a head space in the package and consequently the package volume is larger than the volume of the food packaged therein. Thus, the transportation efficiency is lowered and the storage space is increased.

Vacuum packaging of unsterilized foods such as raw foods entails strict temperature control during storage because such foods are at risk of the growth of microorganisms during storage.

To address these problems, Patent Document 1 discloses a food packaging method which involves filling a gas containing 50-100% by volume carbon dioxide. However, the patent document does not specify the amount of the fill gas. Filling the gas in a very large amount increases the volume of gas spaces such as head spaces, and it is difficult that the packages have a minimized volume. The fill gas substantially disclosed in the patent document is a carbon dioxide/nitrogen mixture gas. However, the nitrogen gas has low solubility in water and this causes an increase in space volume.

Patent Document 2 discloses a technique in which a water-containing processed food is placed in a package while the surface temperature of the food is maintained at 70 to 140° C. and the processed food accounts for 60 to 95% by volume of the package, and the package is filled with carbon dioxide and then sealed. This technique involves packaging the food while the food is heated to the above surface temperature and thus cannot be adopted for raw foods such as meat.

Patent Document 3 discloses a method wherein a food that absorbs carbon dioxide is packaged and solid carbon dioxide such as dry ice is placed in the package. In this method, however, the contact with dry ice causes freezer burn. Further, this method does not sufficiently address deaeration of oxygen or the like, and it is likely that oxygen or the like remains in the packages.

Patent Document 1: JP-A-S60-110663
Patent Document 2: JP-A-H10-225267
Patent Document 3: JP-A-H04-87926

SUMMARY OF THE INVENTION

It is an object of the invention to provide food packaging methods in which food is packaged in a package with use of carbon dioxide to benefit from bacteriostatic effects and the package contains the minimum reduced gas spaces, and to provide tightly-fitting food packages obtained by the methods.

The present inventors studied diligently to achieve the above object. They have then invented a specific tightly-fitting food package which includes a package, a food and carbon dioxide gas. According to the findings by the present inventors, the carbon dioxide gas is dissolved in water contained in the food and consequently the gas space in the package is reduced, whereby the food is tightly-fitting in the package such as a plastic film and the food package forms a pseudo vacuum package. The present invention has been completed based on the findings.

In detail, the invention is concerned with the following (1) to (10).

(1) A tightly-fitting food package comprising a plastic film package, a food and a carbon dioxide gas, which is obtained by: placing at least one kind of foods selected from the group consisting of meats and processed meats in a plastic film package; blowing a carbon dioxide gas in the package to fill the package with the carbon dioxide gas in a volume of 10 to 45 cm3 per 100 g of the food as measured at 0° C. and 1 atm; and sealing and refrigerating the package.

(2) The tightly-fitting food package described in (1) above, wherein the food has a water content of not less than 60 wt % as measured with an infrared moisture gauge by a normal pressure heat drying method.

(3) The tightly-fitting food package described in (1) or (2) above, wherein the food is an unheated food.

(4) The tightly-fitting food package described in any one of (1) to (3) above, wherein the refrigerating is performed by keeping the food package at a temperature of 0 to 10° C. for 2 to 5 days.

(5) The tightly-fitting food package described in any one of (1) to (4) above, wherein the package is a pouch type package or a pillow type package.

(6) A food packaging method comprising: placing at least one kind of foods selected from the group consisting of meats and processed meats in a plastic film package; blowing a carbon dioxide gas in the package to fill the package with the carbon dioxide gas in a volume of 10 to 45 cm3 per 100 g of the food as measured at 0° C. and 1 atm; and sealing and refrigerating the package.

(7) The food packaging method described in (6) above, wherein the food has a water content of not less than 60 wt % as measured with an infrared moisture gauge by a normal pressure heat drying method.

(8) The food packaging method described in (6) or (7) above, wherein the food is an unheated food.

(9) The food packaging method described in any one of (6) to (8) above, wherein the refrigerating is performed by keeping the food package at a temperature of 0 to 10° C. for 2 to 5 days.

(10) The food packaging method described in any one of (6) to (9) above, wherein the package is a pouch type package or a pillow type package.

ADVANTAGEOUS EFFECTS OF THE INVENTION

According to the tightly-fitting food packages and the food packaging methods of the invention, food is packaged in a package together with a carbon dioxide gas having bacteriostatic effects. The foods that are packaged benefit from bacteriostatic effects, and the food packages contain the minimum reduced gas spaces and thereby have a volume comparable to conventional vacuum packages.

PREFERRED EMBODIMENTS FOR CARRYING OUT THE INVENTION

The present invention will be described in detail hereinbelow.

⟨Food Packaging Methods⟩

A food packaging method according to the invention includes placing at least one kind of foods selected from the group consisting of meats and processed meats in a plastic film package; blowing a carbon dioxide gas in the package to fill the package with the carbon dioxide gas in a volume of 10 to 45 cm3 per 100 g of the food as measured at 0° C. and 1 atm; and sealing and refrigerating the package. By the food packaging method, tightly-fitting food packages of the invention including a package, a food and a carbon dioxide gas may be obtained.

In the food packaging methods of the invention, at least one kind of foods selected from the group consisting of meats and processed meats is packaged. Preferably, the food has a water content of not less than 60 wt %, and more preferably from 60 to 75 wt % as measured with an infrared moisture gauge by a normal pressure heat drying method. The upper limit of the water content is not particularly limited. In the at least one kind of foods selected from meats and processed meats, however, the water content is usually not more than 80 wt %.

In the normal pressure heat drying method with an infrared moisture gauge, the food is weighed on a balance and is heated with an infrared lamp (at approximately 105 to 110° C.), and the weight reduced by the heating is obtained as the water content in the food.

The above water content permits a large amount of carbon dioxide gas to dissolve in the food, and the obtainable tightly-fitting food package has tighter contact between the package and the food, thereby reducing gas spaces to an extremely low level.

Examples of the meats for use as foods in the invention include livestock meats such as beef, pork, mutton and fowl (including chicken, turkey and duck).

The meat shapes are not particularly limited. Exemplary shapes of beef, pork and mutton include cuts (meat mass weighing 5 to 10 kg, cut from dressed carcass), blocks (meat mass weighing less than 5 kg, cut from dressed carcass), slices and mince. Exemplary shapes of chicken include whole chicken (without head, feathers and internal organs), blocks, slices and mince.

Examples of the processed meats include ham, sausage and bacon.

Of these foods, meats and processed meats consumed without heating such as raw ham are preferable because such foods benefit from higher food sanitation by the bacteriostatic effects of carbon dioxide.

The effects of the present invention are remarkable for unheated foods. Unheated foods will inevitably contain microorganisms such as bacteria, and bacterial increase raises a risk of food poisoning. The food packaging methods of the invention involve carbon dioxide gas which has bacteriostatic effects. By filling the carbon dioxide gas, the growth of microorganisms attached on the unheated foods is effectively prevented.

In the case of meats, unheated foods refer to meats that have been subjected to a meat temperature of below 50° C. after slaughtering and disassembling.

In the disassembling processes of animals such as cows, pigs, chickens and lambs that have been slaughtered, the hair is removed and the residual hair is eliminated. For example, chickens are soaked in hot water at 50 to 88° C. for several seconds to several tens of seconds (scalding), and pigs are processed with a gas burner to burn off the hair on the skin surface. These processes apply heat to the meat instantaneously. In the invention, even if the meats have undergone such instantaneous heating processes, the meats are regarded as unheated foods when the meat temperature has been below 50° C. after the slaughtering and disassembling.

In the case of processed meats, unheated foods refer to processed food products of meats that have been at a meat temperature of below 50° C. after slaughtering and disassembling, with addition of food additives such as spices, seasonings, coloring additives, binders, colorants, preservatives (antiseptic agents), sanitizers and anti-oxidants.

The plastic film packages used in the food packaging methods of the invention are not particularly limited. To prevent the oxidation of food during storage and transportation more effectively, gas barrier plastic film packages are preferable. Examples of the gas barrier plastic films include ethylene/vinyl alcohol copolymer films, MXD nylon films, vinylidene chloride copolymer films, inorganic vapor deposited films deposited with silicon oxide, aluminum oxide or the like, and polyacrylic acid-coated films.

The plastic film may be a single layer or a multilayer structure of the films.

Examples of the single-layer plastic films include single-layer films of plastics such as polyolefins (low density polyethylene, high density polyethylene, linear low density polyethylene, polypropylene), polyamides (nylons such as Nylon 6, Nylon 66, Nylon 46, Nylon 6-66 and Nylon MXD), polyesters (polyethylene terephthalate (hereinafter, also PET)), ethylene terephthalate/isophthalate copolymer (hereinafter, also Co-PET)) and polyvinylidene chloride.

Examples of the multilayer plastic films include multilayer plastic films having the following structures: PET/adhesive layer/nylon/ethylene vinyl alcohol copolymer/adhesive layer/polyethylene, and Co-PET/adhesive layer/nylon/ethylene vinyl alcohol copolymer/adhesive layer/polyethylene.

Preferred plastic films are single-layer plastic films of polyvinylidene chloride and ethylene/vinyl alcohol copolymer, and multilayer plastic films having a polyvinylidene chloride layer or an ethylene/vinyl alcohol copolymer layer. These preferred films have excellent gas barrier properties and prevent more effectively the food oxidation during storage and transportation of the tightly-fitting food packages.

The thickness of the plastic films may vary depending on the type of the film. Generally, the thickness is in the range of 40 to 90 μm, and preferably 40 to 70 μm.

In view of productivity improvement in use of continuous packaging devices, preferred types of the plastic film packages include pouch type packages (such as bottom seal pouch packages and three side seal pouch packages) and pillow type packages.

It is preferable to adopt a continuous gas-filling packaging device for the production of pouch type packages or pillow type packages. The continuous gas-filling packaging device permits continuous production of pouch type packages or pillow type packages in contrast to batch processes, providing quick operation properties and expected increase in productivity.

The tightly-fitting food packages obtained by the food packaging methods of the invention contain a carbon dioxide gas. The carbon dioxide gas is blown into the packages containing the food and immediately replaces air in the packages. It is preferable to adopt a continuous gas-filling packaging device of gas flush type (gas blowing type) for the filling of carbon dioxide gas in the packages.

The carbon dioxide gas is filled in the packages in an amount such that the volume thereof as measured at 0° C. and 1 atm is in the range of 10 to 45 cm3, and preferably 10 to 40 cm3 per 100 g of the food. If the volume of the carbon dioxide gas is below 10 cm3, sufficient bacteriostatic effects may not be obtained. If the volume exceeds 45 cm3, part of the carbon dioxide gas remains without being absorbed in the foods even after the packages are refrigerated and thus causes gas spaces in the tightly-fitting food packages.

In the food packaging methods of the invention, the packages filled with the carbon dioxide gas are sealed. The sealing may be performed by closing the mouth of the packages filled with the carbon dioxide by means of a heat sealer or the like.

The food packaging methods of the invention are accomplished by refrigerating the sealed packages. The refrigerating promotes the dissolution of the carbon dioxide gas into the foods. The refrigerating temperature is 0 to 10° C.

In a preferred embodiment of the food packaging methods of the invention, the refrigerating is performed by keeping the food package at a temperature of 0 to 10° C. for 2 to 5 days. Refrigeration for less than 2 days tends to result in insufficient dissolution of the carbon dioxide gas into the foods and consequent gas spaces in the tightly-fitting food packages. The dissolution of the carbon dioxide into the foods reaches equilibrium in 5 days of refrigeration and the volume of the tightly-fitting food packages will not be reduced thereafter.

If the temperature is below 0° C., water in the foods is frozen to inhibit the dissolution of the carbon dioxide gas in the foods.

In the food packaging methods of the invention, a drip-absorbing sheet or the like may be provided in the packages before or after the food is placed in the packages.

Drip-absorbing sheets in the packages make meat drips less recognizable and thereby improve the appearance of the tightly-fitting food packages.

In the food packaging methods of the invention, the packages containing the foods may be deaerated before blowing the carbon dioxide gas. The deaeration may be performed with a nozzle type deaerating packaging device or a vacuum packaging device.

⟨Tightly-Fitting Food Packages⟩

The tightly-fitting food packages of the invention include a plastic film package, a food and a carbon dioxide gas. They are obtained by placing at least one kind of foods selected from meats and processed meats in a plastic film package; blowing a carbon dioxide gas in the package to fill the package with the carbon dioxide gas in a volume of 10 to 45 cm3 per 100 g of the food as measured at 0° C. and 1 atm; and sealing and refrigerating the package.

The tightly-fitting food packages may be obtained by the foregoing food packaging methods and include the package, the food and the carbon dioxide gas described hereinabove.

In the tightly-fitting food packages, almost 100% of the carbon dioxide gas is dissolved in the foods. Therefore, the volume of the tightly-fitting food packages is approximately equal to the total volume of the package and the food. From outward appearances, the tightly-fitting food packages are similar to vacuum food packages with the package tightly contacting the food. The volume of gas spaces in the tightly-fitting food packages is generally 0 (no gas spaces observed) to less than 1% by volume relative to 100% by volume of the volume of the tightly-fitting food package.

The tightly-fitting food packages are preferably kept refrigerated after produced, for example during transportation to the market. The carbon dioxide dissolved in the foods can vaporize at increased temperatures and can cause gas spaces.

EXAMPLES

The present invention will be described in greater detail by examples hereinbelow without limiting the scope of the invention.

Example 1

Sliced beef (1 kg, water content: 60 wt %) was placed in a package (trade name: VS20, manufactured by KUREHA CORPORATION, three side seal pouch package, inner size: 240 mm×400 mm) that was made of a multilayer plastic film (film constitution: Co-PET/adhesive layer/Ny/EVOH/adhesive layer/PE, thickness: 40 μm, Co-PET: ethylene terephthalate/isophthalate copolymer (terephthalic acid: 88 mol %), Ny: nylon, EVOH: ethylene/vinyl alcohol copolymer, PE: polyethylene). The head space in the package was deaerated with a vacuum packaging device, and a carbon dioxide gas was added in an amount such that the volume thereof at 0° C. and 1 atm would be 100 cm3. The package was then sealed with a heat sealer (manufactured by FUJI IMPULSE CO., LTD., seal width: 5 mm).

The sealed package was stored in a refrigerator at 5° C. for 4 days, and a tightly-fitting food package was obtained.

The tightly-fitting food package was visually observed to evaluate the degree of contact between the plastic film package and the sliced beef. Bacteria counts (viable bacteria count and coliform bacteria count) were determined.

The results are set forth in Table 1.

The degree of contact between the plastic film and the sliced beef was visually evaluated based on the proportion of gas spaces in the package. The package with no gas spaces was evaluated AA, and the package with gas spaces was evaluated CC.

In detail, the package was evaluated AA when the plastic film and the content were in intimate contact without gas spaces, and was evaluated CC when they were not in intimate contact (gas space) even in part therebetween.

The bacteria counts were determined as follows. The sliced beef was diluted with a tenfold amount of sterile physiological saline to give a test liquid. One (1) ml of the test liquid was placed in sterile Petri dishes. For the viable bacteria count, a standard agar medium (manufactured by NISSUI PHARMACEUTICAL CO., LTD.) was added and the bacteria were cultured at 37° C. for 2 days. For the coliform bacteria count, a desoxycholate agar medium (manufactured by NISSUI PHARMACEUTICAL CO., LTD.) was added and the bacteria were cultured at 37° C. for 1 day. The colonies that grew were counted.

Example 2

The procedures of Example 1 were repeated except that the carbon dioxide volume was changed to 250 cm3.

The tightly-fitting food package obtained was visually observed to evaluate the degree of contact between the plastic film package and the sliced beef. The bacteria counts (viable bacteria count and coliform bacteria count) were determined.

The results are set forth in Table 1.

Comparative Example 1

The procedures of Example 1 were repeated except that the carbon dioxide volume was changed to 0 cm3.

The tightly-fitting food package obtained was visually observed to evaluate the degree of contact between the plastic film package and the sliced beef. The bacteria counts (viable bacteria count and coliform bacteria count) were determined.

The results are set forth in Table 1.

Comparative Example 2

The procedures of Example 1 were repeated except that the carbon dioxide volume was changed to 500 cm3.

The tightly-fitting food package obtained was visually observed to evaluate the degree of contact between the plastic film package and the sliced beef. The bacteria counts (viable bacteria count and coliform bacteria count) were determined.

The results are set forth in Table 1.

Comparative Example 3

The procedures of Example 1 were repeated except that the carbon dioxide volume was changed to 1000 cm3.

The tightly-fitting food package obtained was visually observed to evaluate the degree of contact between the plastic film package and the sliced beef. The bacteria counts (viable bacteria count and coliform bacteria count) were determined.

The results are set forth in Table 1.

Example 3

Sliced beef (620 g, water content: 70 wt %) was placed in a package (trade name: VS20, manufactured by KUREHA CORPORATION, three side seal pouch package, inner size: 240 mm×400 mm) that was made of a multilayer plastic film (film constitution: Co-PET/adhesive layer/Ny/EVOH/adhesive layer/PE, thickness: 40 µm, Co-PET: ethylene terephthalate/isophthalate copolymer (terephthalic acid: 88 mol %), Ny: nylon (polyamide), EVOH: ethylene/vinyl alcohol copolymer, PE: polyethylene). The head space in the package was deaerated with a vacuum packaging device, and a carbon dioxide gas was added in an amount such that the volume thereof at 0° C. and 1 atm would be 100 cm3. The package was then sealed with a heat sealer (manufactured by FUJI IMPULSE CO., LTD., seal width: 5 mm).

The sealed package was stored in a refrigerator at 5° C. for 4 days, and a tightly-fitting food package was obtained.

The tightly-fitting food package was visually observed to evaluate the degree of contact between the plastic film package and the sliced beef.

The results are set forth in Table 2.

Example 4

The procedures of Example 3 were repeated except that the carbon dioxide volume was changed to 250 cm3.

The tightly-fitting food package obtained was visually observed to evaluate the degree of contact between the plastic film package and the sliced beef.

The results are set forth in Table 2.

Comparative Example 4

The procedures of Example 3 were repeated except that the carbon dioxide volume was changed to 500 cm3.

The tightly-fitting food package obtained was visually observed to evaluate the degree of contact between the plastic film package and the sliced beef.

The results are set forth in Table 2.

TABLE 1

Results of package appearance evaluation and bacterial counting based on differing $CO_2$ amounts relative to content weight*[1]

| | Sample | $CO_2$ amount*[2] (cm3) | $CO_2$ amount*[2] per 100 g of food (cm3) | Package appearance evaluation*[3] | Bacteria counts (CFU/g)*[4] | | Comprehensive evaluation*[5] |
| | | | | | Viable bacteria count | Coliform bacteria count | |
|---|---|---|---|---|---|---|---|
| Comp. Ex. 1 | 1 | 0 | 0 | AA | $1.0 \times 10^3$ | $6.0 \times 10$ | CC |
| | 2 | | | AA | $1.0 \times 10^4$ | $3.0 \times 10^2$ | CC |
| Ex. 1 | 1 | 100 | 10 | AA | $5.4 \times 10$ | <10 | AA |
| | 2 | | | AA | $4.0 \times 10$ | <10 | AA |
| Ex. 2 | 1 | 250 | 25 | AA | $3.0 \times 10$ | <10 | AA |
| | 2 | | | AA | $2.0 \times 10$ | <10 | AA |
| Comp. Ex. 2 | 1 | 500 | 50 | CC | $5.0 \times 10$ | <10 | CC |
| | 2 | | | CC | $1.2 \times 10^2$ | <10 | CC |
| Comp. Ex. 3 | 1 | 1000 | 100 | CC | $5.0 \times 10$ | $1.0 \times 10$ | CC |
| | 2 | | | CC | $1.2 \times 10^2$ | $1.0 \times 10$ | CC |

*[1]Sliced beef (1 kg, water content: 60%) was packaged.
*[2]Converted to volume at 0° C. and 1 atm.
*[3]AA: no gas spaces in package, CC: gas spaces in package
*[4]Viable bacteria count: Bacteria were grown in a standard agar medium at 37° C. for 2 days, and the colonies were counted.
Coliform bacteria count: Bacteria were grown in a desoxycholate agar medium at 37° C. for 1 day, and the colonies were counted.
*[5]AA: Good appearance and good bacteriostatic effects
CC: Bad appearance or bad bacteriostatic effects

Comparative Example 5

The procedures of Example 3 were repeated except that the carbon dioxide volume was changed to 1000 cm3.

The tightly-fitting food package obtained was visually observed to evaluate the degree of contact between the plastic film package and the sliced beef.

The results are set forth in Table 2.

TABLE 2

Results of package appearance evaluation based on differing $CO_2$ amounts relative to content weight *1

| Sample | | CO2 amount *2 (cm3) | CO2 amount *2 per 100 g of food (cm3) | Package appearance evaluation *3 |
|---|---|---|---|---|
| Ex. 3 | 1 | 100 | 16 | AA |
| | 2 | | | AA |
| Ex. 4 | 1 | 250 | 40 | AA |
| | 2 | | | AA |
| Comp. Ex. 4 | 1 | 500 | 81 | CC |
| | 2 | | | CC |
| Comp. Ex. 5 | 1 | 1000 | 161 | CC |
| | 2 | | | CC |

*1: Sliced beef (620 g, water content: 70%) was packaged.
*2: Converted to volume at 0° C. and 1 atm.
*3: AA: no gas spaces in package, CC: gas spaces in package EXAMPLE 5

Sliced pork (1 kg, water content: 64 wt %) was placed in a package (trade name: VS20, manufactured by KUREHA CORPORATION, three side seal pouch package, inner size: 240 mm×400 mm) that was made of a multilayer plastic film (film constitution: Co-PET/adhesive layer/Ny/EVOH/adhesive layer/PE, thickness: 40 μm, Co-PET: ethylene terephthalate/isophthalate copolymer (terephthalic acid: 88 mol %), Ny: nylon (polyamide), EVOH: ethylene/vinyl alcohol copolymer, PE: polyethylene). The head space in the package was deaerated with a vacuum packaging device, and a carbon dioxide gas was added in an amount such that the volume thereof at 0° C. and 1 atm would be 100 cm$^3$. The package was then sealed with a heat sealer (manufactured by FUJI IMPULSE CO., LTD., seal width: 5 mm).

The sealed package was stored in a refrigerator at 5° C. for 4 days, and a tightly-fitting food package was obtained.

The tightly-fitting food package was visually observed to evaluate the degree of contact between the plastic film package and the sliced pork. Bacteria count (psychrophilic bacteria count) was determined.

The results are set forth in Table 3.

The psychrophilic bacteria count was determined as follows. The sliced pork was diluted with a tenfold amount of sterile physiological saline to give a test liquid. One (1) ml of the test liquid was placed in sterile Petri dishes. A YGA agar medium (manufactured by NISSUI PHARMACEUTICAL CO., LTD.) was added and the bacteria were cultured at 10° C. for 5 days. The colonies that grew were counted.

Example 6

The procedures of Example 5 were repeated except that the carbon dioxide volume was changed to 250 cm3.

The tightly-fitting food package obtained was visually observed to evaluate the degree of contact between the plastic film package and the sliced pork. The bacteria count (psychrophilic bacteria count) was determined.

The results are set forth in Table 3.

Comparative Example 6

The procedures of Example 5 were repeated except that the carbon dioxide volume was changed to 0 cm3.

The tightly-fitting food package obtained was visually observed to evaluate the degree of contact between the plastic film package and the sliced pork. The bacteria count (psychrophilic bacteria count) was determined.

The results are set forth in Table 3.

Comparative Example 7

The procedures of Example 5 were repeated except that the carbon dioxide volume was changed to 500 cm3.

The tightly-fitting food package obtained was visually observed to evaluate the degree of contact between the plastic film package and the sliced pork. The bacteria count (psychrophilic bacteria count) was determined.

The results are set forth in Table 3.

Comparative Example 8

The procedures of Example 5 were repeated except that the carbon dioxide volume was changed to 1000 cm3.

The tightly-fitting food package obtained was visually observed to evaluate the degree of contact between the plastic film package and the sliced pork. The bacteria count (psychrophilic bacteria count) was determined.

The results are set forth in Table 3.

TABLE 3

Results of package appearance evaluation and bacterial counting based on differing $CO_2$ amounts relative to content weight*1

| Sample | | CO2 amount*2 (cm3) | CO2 amount*2 per 100 g of food (cm3) | Package appearance evaluation*3 | Bacteria count (CFU/g)*4 Psychrophilic bacteria count | Comprehensive evaluation*5 |
|---|---|---|---|---|---|---|
| Comp. Ex. 6 | 1 | 0 | 0 | AA | 1.0 × 102 | CC |
| | 2 | | | AA | 3.0 × 102 | CC |
| Ex. 5 | 1 | 100 | 10 | AA | <10 | AA |
| | 2 | | | AA | <10 | AA |
| Ex. 6 | 1 | 250 | 25 | AA | <10 | AA |
| | 2 | | | AA | <10 | AA |
| Comp. Ex. 7 | 1 | 500 | 50 | CC | <10 | CC |
| | 2 | | | CC | <10 | CC |
| Comp. Ex. 8 | 1 | 1000 | 100 | CC | <10 | CC |
| | 2 | | | CC | <10 | CC |

*1Sliced pork (1 kg, water content: 64%) was packaged.
*2Converted to volume at 0° C. and 1 atm.
*3AA: no gas spaces in package, CC: gas spaces in package
*4Psychrophilic bacteria count: Bacteria were grown in a YGA agar medium at 10° C. for 5 days, and the colonies were counted.
*5AA: Good appearance and good bacteriostatic effects
CC: Bad appearance or bad bacteriostatic effects

Example 7

Minced pork (800 g, water content: 65 wt %) was placed in a package (trade name: VS20, manufactured by KUREHA CORPORATION, three side seal pouch package, inner size: 240 mm×400 mm) that was made of a multilayer plastic film (film constitution: Co-PET/adhesive layer/Ny/EVOH/adhesive layer/PE, thickness: 40 μm, Co-PET: ethylene terephthalate/isophthalate copolymer (terephthalic acid: 88 mol %), Ny: nylon (polyamide), EVOH: ethylene/vinyl alcohol copolymer, PE: polyethylene). The head space in the package was deaerated with a vacuum packaging device, and a carbon dioxide gas was added in an amount such that the volume thereof at 0° C. and 1 atm would be 100 cm3. The package was then sealed with a heat sealer (manufactured by FUJI IMPULSE CO., LTD., seal width: 5 mm).

The sealed package was stored in a refrigerator at 5° C. for 4 days, and a tightly-fitting food package was obtained.

The tightly-fitting food package was visually observed to evaluate the degree of contact between the plastic film package and the minced pork.

The results are set forth in Table 4.

Example 8

The procedures of Example 7 were repeated except that the carbon dioxide volume was changed to 250 cm3.

The tightly-fitting food package obtained was visually observed to evaluate the degree of contact between the plastic film package and the minced pork.

The results are set forth in Table 4.

Comparative Example 9

The procedures of Example 7 were repeated except that the carbon dioxide volume was changed to 500 cm3.

The tightly-fitting food package obtained was visually observed to evaluate the degree of contact between the plastic film package and the minced pork.

The results are set forth in Table 4.

Comparative Example 10

The procedures of Example 7 were repeated except that the carbon dioxide volume was changed to 1000 cm3.

The tightly-fitting food package obtained was visually observed to evaluate the degree of contact between the plastic film package and the minced pork.

The results are set forth in Table 4.

TABLE 4

Results of package appearance evaluation based on differing CO2 amounts relative to content weight *1

|  | Sample | CO2 amount *2 (cm3) | CO2 amount *2 per 100 g of food (cm3) | Package appearance evaluation *3 |
|---|---|---|---|---|
| Ex. 7 | 1 | 100 | 13 | AA |
|  | 2 |  |  | AA |
| Ex. 8 | 1 | 250 | 31 | AA |
|  | 2 |  |  | AA |
| Comp. Ex. 9 | 1 | 500 | 63 | CC |
|  | 2 |  |  | CC |
| Comp. Ex. 10 | 1 | 1000 | 125 | CC |
|  | 2 |  |  | CC |

*1: Minced pork (800 g, water content: 65%) was packaged.
*2: Converted to volume at 0° C. and 1 atm.
*3: AA: no gas spaces in package, CC: gas spaces in package Two samples were tested in each Example and each Comparative Example, as shown in Tables.

The water contents in the meats used in Examples and Comparative Examples were determined beforehand by analyzing similar meats with an infrared moisture gauge by a normal pressure heat drying method (heating temperature: 105 to 110° C.).

The results in Tables 1 to 4 show that the carbon dioxide gas filled in amounts such that the volume thereof at 0° C. and 1 atm will be 10 to 45 $cm^3$ per 100 g of the food provides intimate contact between the food and the plastic film package, minimizes the package volume, and inhibits bacterial growth.

The invention claimed is:

1. A food packaging method comprising:
placing at least one kind of foods selected from the group consisting of meats and processed meats in a plastic film package;
deaerating the plastic film package;
blowing a carbon dioxide gas in the plastic film package to fill the package with the carbon dioxide gas in a volume of 10 to 45 $cm^3$ per 100 g of the food as measured at 0° C. and 1 atm; and
sealing and refrigerating the package,
wherein after sealing and refrigerating the package, an amount of gas in the package is less than 1% of the package's volume,
wherein after sealing and refrigerating, the package consists of the plastic film package, the foods and the carbon dioxide gas.

2. The food packaging method according to claim 1, wherein the food has a water content of not less than 60 wt % as measured with an infrared moisture gauge by a normal pressure heat drying method, the normal pressure heat drying method comprises heating the food from 105° C. to 110° C., wherein the food weight reduction corresponds to moisture content.

3. The food packaging method according to claim 1, wherein the food is an unheated food.

4. The food packaging method according to claim 1, wherein the refrigerating is performed by keeping the food package at a temperature of 0 to 10° C. for 2 to 5 days.

5. The food packaging method according to claim 1, wherein the plastic film package is a pouch type package or a pillow type package.

* * * * *